United States Patent [19]
Lykken et al.

[11] Patent Number: 5,899,542
[45] Date of Patent: May 4, 1999

[54] SUPPORT SYSTEM FOR ROLLER WHEELS OF RUBBER TRACKED VEHICLE

[75] Inventors: Thomas G. Lykken; Brian D. Vik, both of Fargo; Peder L. Pederson, West Fargo, all of N. Dak.

[73] Assignee: Case Corporation, Racine, Wis.

[21] Appl. No.: 08/800,041

[22] Filed: Feb. 14, 1997

[51] Int. Cl.$^6$ .................................................. B62D 55/108
[52] U.S. Cl. .......................... 305/131; 305/129; 180/9.54
[58] Field of Search ..................... 305/124, 129, 305/130, 131, 138; 180/9.5, 9.54

[56] References Cited

U.S. PATENT DOCUMENTS

| | | |
|---|---|---|
| 1,275,343 | 8/1918 | White . |
| 1,514,187 | 11/1924 | Wickersham . |
| 2,775,492 | 12/1956 | Wirkkala . |
| 3,695,737 | 10/1972 | Alexander . |
| 3,764,184 | 10/1973 | Orr et al. ................................. 305/138 |
| 3,774,708 | 11/1973 | Purcell . |
| 3,913,987 | 10/1975 | Baldwin . |
| 3,929,729 | 12/1975 | Chung . |
| 3,938,606 | 2/1976 | Yancey ................................. 305/131 X |
| 3,985,402 | 10/1976 | Reinsma . |
| 4,351,572 | 9/1982 | Fujiwara et al. ......................... 305/138 |
| 4,519,654 | 5/1985 | Satzler et al. ........................... 305/138 |
| 4,582,367 | 4/1986 | Jacquet et al. ........................... 305/131 |
| 5,127,714 | 7/1992 | Satzler . |
| 5,293,948 | 3/1994 | Crabb . |
| 5,312,176 | 5/1994 | Crabb . |
| 5,456,331 | 10/1995 | Gustin . |

*Primary Examiner*—Russell D. Stormer
*Attorney, Agent, or Firm*—Foley & Lardner

[57] ABSTRACT

A system for supporting roller wheels from the undercarriage of a tracked vehicle having a rubber track. A beam, extending transverse to the axles of the roller wheels mounted thereon, is supported at each end by a resilient suspension element which provides resilient support in the vertical direction and limited resilience to "fore" and "aft" and rolling motion of the beam, and the roller wheels mounted thereon, with respect to the undercarriage

22 Claims, 3 Drawing Sheets

5,899,542

SUPPORT SYSTEM FOR ROLLER WHEELS OF RUBBER TRACKED VEHICLE

CROSS REFERENCE TO RELATED APPLICATIONS

The present application is related to U.S. Application Ser. No. 08/745,373, entitled, "Vehicle Track Undercarriage Adjustment System," filed Nov. 8, 1996, and U.S. Application Ser. No. 08/801,794, entitled: Resilient Support Element For Roller Wheels of A Rubber Tracked Vehicle, filed contemporaneously herewith Both of the aforementioned applications are assigned to the Assignee of the present invention.

FIELD OF THE INVENTION

The present invention relates to the undercarriage of a tracked vehicle. More particularly it relates to a system for supporting a plurality of roller wheels from the undercarriage of a tracked vehicle having a rubber track.

BACKGROUND OF THE INVENTION

Self-propelled tracked work vehicles, such as agricultural tractors and combines, are frequently provided with an undercarriage which supports a pair of idler wheels and, several roller wheels located between the idler wheels, over which wheels passes a track driven by a drive wheel. The roller wheels are intended to apply a downwardly directed force to the portion of the track between the idler wheels, which is in engagement with the surface supporting the vehicle.

Rubber tracked vehicles, and particularly those supported on four tracks, i.e. two spaced apart tracks on each side of the vehicle, have excellent ride characteristics in agricultural fields and reduce soil compaction, since the rubber track undercarriage spans most "holes" or surface irregularities in the fields, and distributes the downward force of the vehicle over a greater surface area. Tires typically fall into holes or other irregularities in the field causing a rough ride. Vehicle tire "power hop," a characteristic which also adversely affects field rides, is reduced by the use of tracks.

However, when rubber tracked vehicles are driven on hard surfaced roads, the ride is not as smooth as it would be with a tired vehicle. The rubber track provides little cushion between the track undercarriage and a hard surfaced road. Tires on an agricultural tractor provide the inherent characteristic of a large air bladder of approximately 18 inches in height, which cushions the vehicle from bumps and vibration as the tractor travels along a hard surface, such as a road. Thus, it would be desirable to place a suspension element between the roller wheel assemblies and the tractor which would smooth out the ride on a hard surfaces.

There have been many suspension elements developed for crawler type steel tracked vehicles in the past. However, what makes the rubber track undercarriages different, or unique, is the fact that the rubber track is extremely flexible and must be supported across the full face of the ground engaging portions of the belt to offer even ground weight distribution. Steel track crawler frames typically have narrow rollers which support a track which has inherent/built-in cross beams to distribute the weight across the width of the-track.

In order to provide a smooth ride on a hard surface, one presently available rubber tracked work vehicle is provided with pivot arms supported by an air bag located above the undercarriage assembly. However, when the drive wheel is located above the undercarriage, often referred to as a high drive type vehicle, it is difficult if not impossible to position the pivot arms and air bag above the undercarriage assembly. In a high drive type rubber track work vehicle, there is only a narrow space above the roller wheels, since the roller wheels are moved as close as possible to each other to more fully support the rubber track. Track tensioning mechanisms also need to be placed in the narrow space above the roller-wheels and below the drive wheel.

Accordingly, it would be advantageous to provide a support system for the rubber track of a rubber tracked vehicle, having a high drive wheel, which provides a smooth ride when travelling on a hard surface

SUMMARY OF THE PRESENT INVENTION

In accordance with this invention, a roller wheel support system for the roller wheels of a rubber tracked vehicle includes a roller wheel beam located between the idler wheels and supported below and parallel to the main undercarriage beam. In a preferred embodiment of this invention, three roller wheel shafts are supported by the roller wheel beam. A track supporting roller wheel is mounted on each end of each shaft on each side of the roller wheel beam, The roller wheel shafts are spaced from each other such that the adjacent roller wheels, on each side of the beam, are as close to each other as possible. The roller wheel beam is supported from the undercarriage support beam in a position such that the lowermost portions of the roller wheels are lower than the lowermost portions of the idler wheels. Thus, the track will engage the road without scuffing, and clearance is allowed for small objects.

Resilient suspension elements are mounted on the ends of the roller wheel beam, between each of the idler wheels and the adjacent roller wheel. The suspension elements are designed to be soft or more resilient in the vertical direction so as to absorb road bumps and vibration, and to be relatively stiff, or less resilient, with respect to "fore" and "aft" and rocking or rolling motions of the vehicle.

Other principal features and advantages of the invention will become apparent to those skilled in the art upon review of the following drawings, the detailed description and the appended claims.

Figure 1:
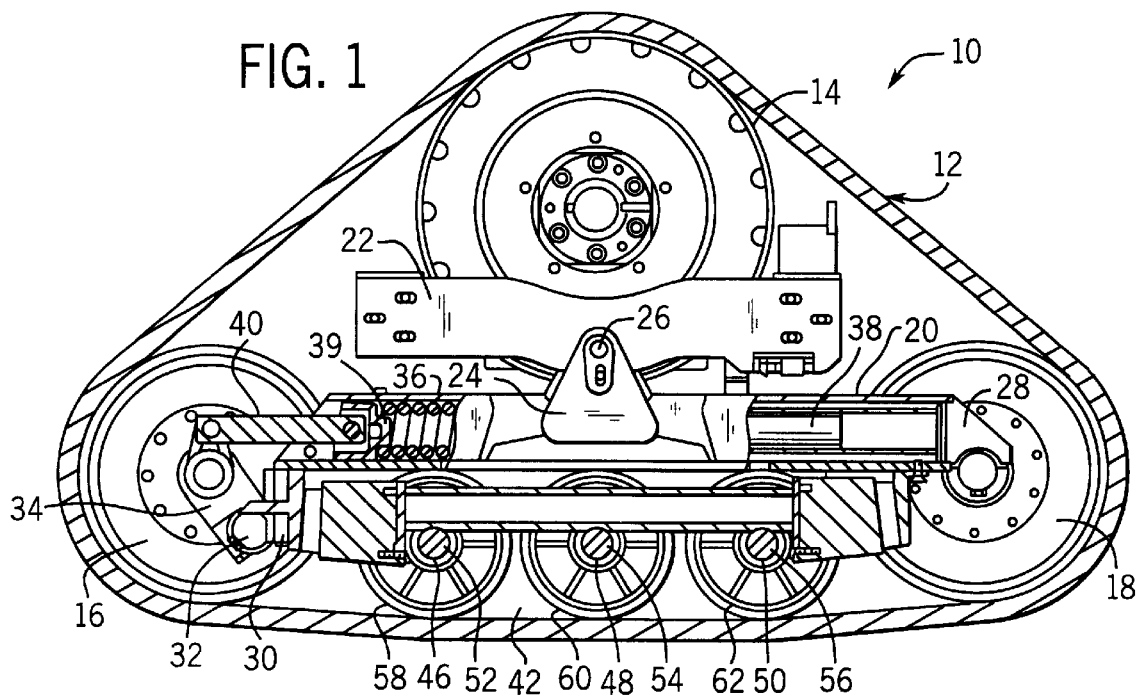
FIG. 1 is a side view, partially in cross-section of a one track of a tracked vehicle showing a drive wheel, and an undercarriage supporting two pairs of idler wheels and a roller wheel assembly in accordance with this invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Referring to FIG. 1, one track assembly 10 of a rubber tracked vehicle showing a drive wheel, and an undercarriage supporting two pairs of idler wheels and a roller wheel assembly in accordance with a preferred embodiment of this invention will be described. In a preferred use of the roller wheel assembly of this invention, two roller wheel assemblies are used on each side of an articulated tracked work vehicle. A roller wheel assembly in accordance with this invention is positioned on each side of the front section of the vehicle and a roller wheel assembly in accordance with this invention is positioned on each side of the rear section of the vehicle.

The track assembly 10 includes a rubber track 12, which passes around a drive wheel 14, two front idler wheels 16, and two rear idler wheels 18. The drive wheel 14 is rigidly supported for rotation on the body of the work vehicle of which the track assembly 10 is a part. The idler wheels 16 and 18 are supported on an undercarriage support beam 20.

The drive wheel 14 is located above the undercarriage support beam 20 and generally midway between the idler wheels. The drive wheel 14 engages track drive lugs which are located in the middle of the inside surface of the track 12.

The main undercarriage support beam 20 is pivotally supported on the vehicle frame by two pivot pins, a first of which is located outboard of the drive wheel and the other of which is located inboard of the drive wheel and is secured on the frame of the vehicle. The first pivot pin 26 for pivotally supporting the undercarriage support beam 20 is supported on an undercarriage bearing support member 22. The bearing support member 22 is adjustably supported in the horizontal direction at each end on one end of a pair of support posts, the other end of which support posts are secured to the frame. The horizontal adjustment, which is accomplished by providing horizontally extending slots in the bearing support member 22 for receiving fasteners secured in the support posts, is for the purpose of aligning the idler and roller wheels with the drive wheel. Without such alignment, the track will not remain centered over each of the wheels. A bracket 24, secured to the undercarriage beam 20, is provided with a hole which receives the first pivot pin 26. First pivot pin 26 also passes through a hole in undercarriage bearing support member 22, and thus serves to pivotally support the undercarriage beam 20 from the undercarriage bearing support member 22.

A similar pivotal support arrangement is provided on the frame, inside of the drive wheel by the other pivot pin. The undercarriage support beam is pivotal up or down 10 degrees from the horizontal about the pivot pins to allow the undercarriage assembly to follow the contour of the ground over which the vehicle is passing, thereby improving both track weight distribution and the smoothness of the ride.

First or rear idler wheels 18 are rigidly mounted for rotation on the rear end of the undercarriage support beam 20. The right or rear end of the undercarriage beam 20 is rigidly secured to a bracket 28 which supports the axle for idler wheels 18. Second or front idler wheels 16 are pivotally mounted for rotation on the front end of the undercarriage support beam 20. The left or front end of the undercarriage beam 20 is rigidly secured to a bracket 30 which supports a pin 32 about which pivots an arm 34 which in turn supports the axle for idler wheels 16. Supported generally within the undercarriage support beam is a track tensioning cylinder and spring assembly which pushes the front pivotable idler wheels 16 forward with respect to both the undercarriage beam 20 and the rear idler wheels 18 to maintain track tension. Idler wheel 16 is urged to the left as shown in FIG. 1, by a hydraulic cylinder 38 which extends between the end of beam 20 and spring 36. The left end of spring 36 is supported by spring guide 39, which is slidingly supported by beam 20 and is pivotally coupled to link 40. The other end of link 40, in turn, is pivotally coupled to the axle of idler wheel 16 at an off-center pivot points. The expansive force of cylinder 38 and spring 36, which tends to push idler wheels 16 and 18 apart, serves to maintain tension on rubber track 12.

Figure 2:
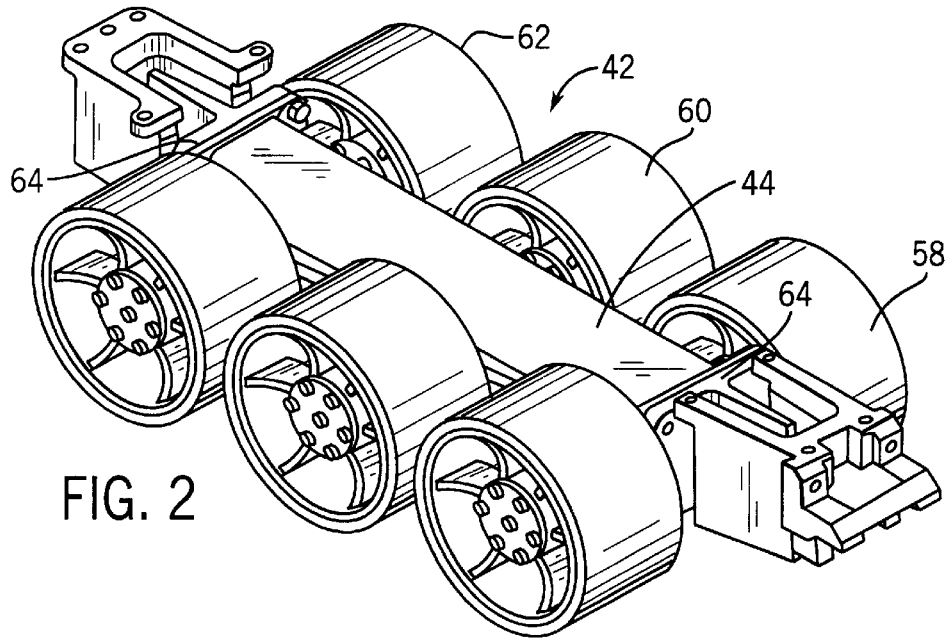
FIG. 2 is a perspective view of the roller wheel assembly including suspension elements as shown in FIG. 1.
Figure 3:
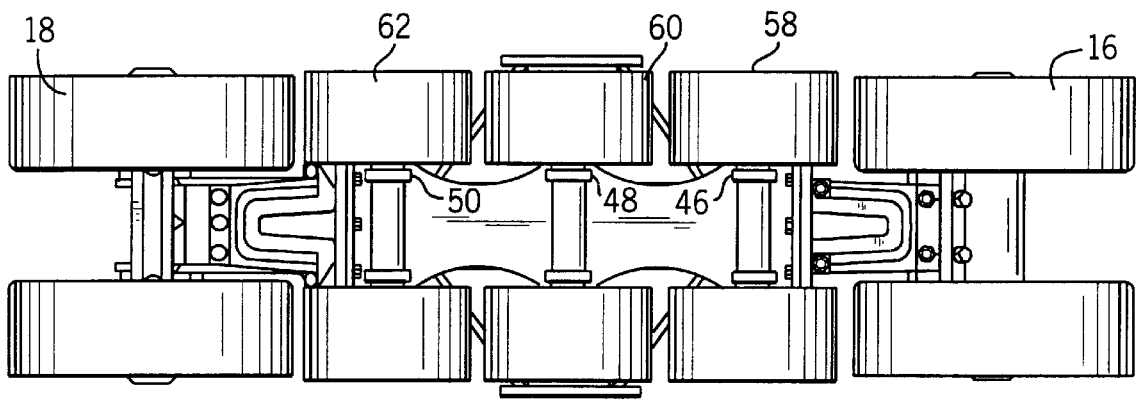
FIG. 3 is bottom view of one undercarriage of a tracked vehicle as shown in FIG. 1.
Figure 4:
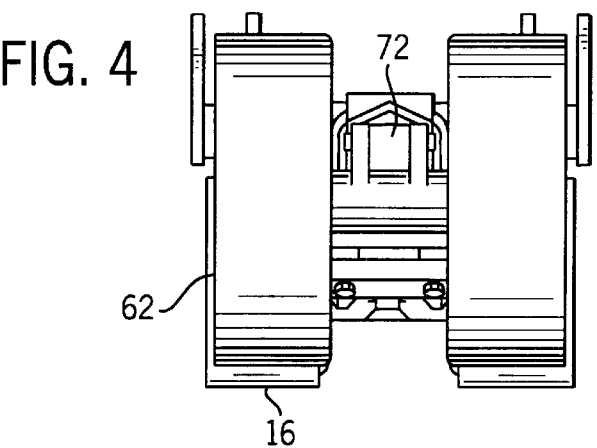
FIG. 4 is an end view of one undercarriage of a tracked vehicle as shown in FIG. 1, traversing a level surface.
Figure 5:
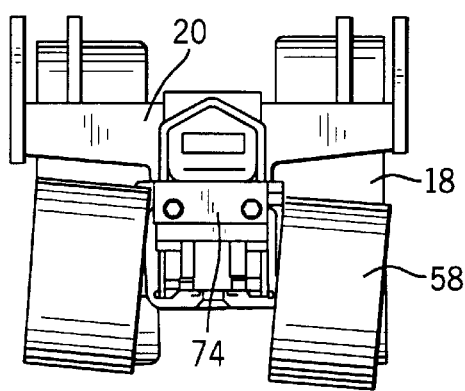
FIG. 5 is an end view of one undercarriage of a tracked vehicle as shown in FIG. 1, traversing an uneven surface.

As shown in FIGS. 1 and 2, a roller wheel assembly 42 in accordance with this invention, is also supported on undercarriage beam 20. The roller wheel assembly 42 includes an elongated beam 44, to the underside of which are secured axles 52, 54 and 56 of roller wheels 58, 60 and 62, respectively, by U-bolts 46, 48 and 50 as shown in FIGS. 2 and 3. The roller wheel assembly 42 is supported at both ends from the undercarriage beam 20 by resilient suspension elements 61 and 63.

Figure 6:
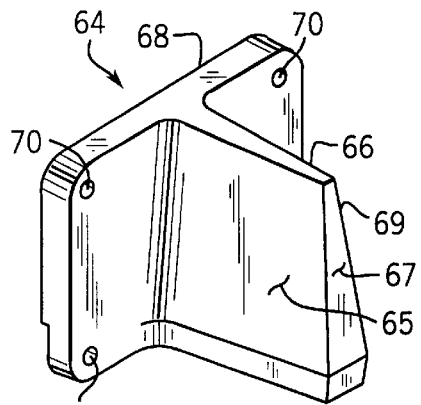
FIG. 6 is an enlarged perspective view of the T-shaped suspension element of the roller wheel assembly shown in FIG. 1.
Figure 7:
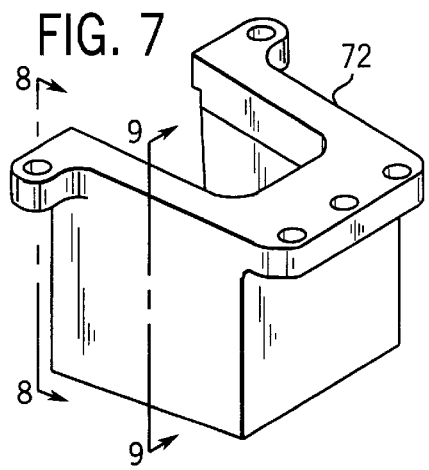
FIG. 7 is an enlarged perspective view of the U-shaped suspension element of the roller wheel assembly shown in FIG. 1.

Each suspension element 61 and 63 includes a first rigid T-shaped support component 64, as shown in FIG. 6, which is secured to the end of elongated beam 44. The T-shaped support component 64 has a leg 66 and a cross-member 68. The leg 66 has a tapered cross-section, being thinner at the top than at the bottom. The cross-member 68 of each of the T-shaped support components 64 is secured to the elongated beam 44 by fastening devices which are received in holes 70, three of which are shown in FIG. 6.

Figure 8:
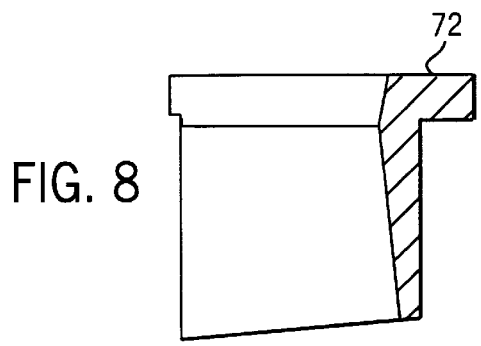
FIG. 8 is a cross-sectional view, taken along the line 8—8 in FIG. 7, of the U-shaped suspension element.
Figure 9:
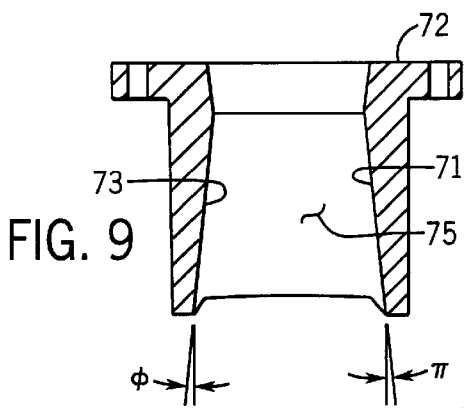
FIG. 9 is a cross-sectional view, taken along the line 9—9 in FIG. 7, of the U-shaped suspension element.
Figure 10:
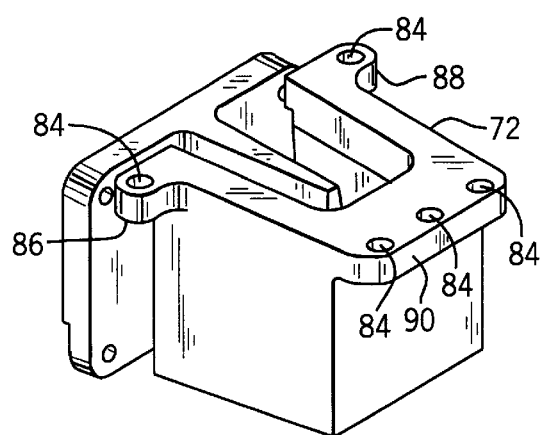
FIG. 10 is an enlarged perspective view showing the T-shaped and U-shaped suspension elements in their relative assembled positions in the rear of the roller wheel assembly shown in FIG. 1.

Each suspension element 61 and 63 also includes a second rigid U-shaped support component which is secured to the undercarriage beam 20 near each of its ends. The U-shaped support components are provided with different mounting arrangements, depending upon whether they are mounted at the front or the rear of the undercarriage beam 20. A rigid U-shaped support component 72 shown in FIGS. 7–11 is used at the rear of the undercarriage beam 20, while a U-shaped support component 74, shown in FIG. 12, is used at the front of undercarriage beam 20. As shown in FIGS. 8 and 9, the side walls of U-shaped support component 72 have a tapered cross-section, being thicker at the top than at the bottom The side walls of U-shaped support component 74 have a similar tapered cross-section, also being thicker at the top than at the bottom.

The U-shaped member 72 is secured to the lower surface of the undercarriage beam 20 by fasteners which are received in holes 84 provided in flanges 86, 88 and 90 provided at the top surface of the U-shaped member.

The U-shaped member 74 (called bracket 30 in FIG. 1) is secured to the lower surface of the undercarriage beam 20 by fasteners which are received in holes 92 provided in the top surface of the U-shaped member. The base of the U-shaped member 74 is provided with a L-shaped extension 94, for the mounting of bracket 30 which supports pin 32.

Figure 11:
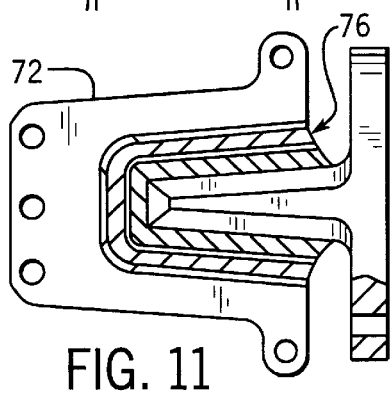
FIG. 11 is an enlarged top view of the T-shaped and U-shaped suspension elements with a resilient member positioned therebetween in accordance with this invention.
Figure 12:
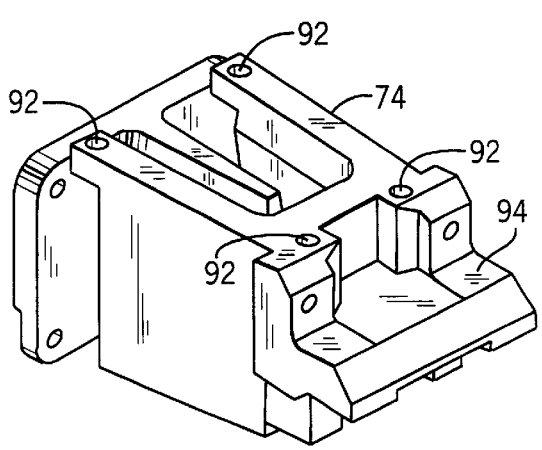
FIG. 12 is an enlarged perspective view showing the T-shaped and an alternate embodiment of the U-shaped suspension elements in their relative assembled positions in the front of the roller wheel assembly shown in FIG. 1.

As shown in FIG. 11, the leg of a T-shaped support component 64 is centered between the legs of U-shaped support component 72. Placed between and secured to the inner walls of the U-shaped support component 72 and to the walls of the leg of the T-shaped component 64 to complete the suspension elements 61 and 63 is a U-shaped resilient component 76. The position which the resilient material occupies between the T- and U-shaped members is intended to provide considerable resilience in the vertical direction and limited resilience to "fore" and "aft" movement, and to rocking and rolling motions between the T- and U-shaped support components.

The suspension elements are uniquely designed to provide a limited range of positions of the roller assembly relative to the balance of the undercarriage structure, including the idler wheels. The resilient suspension elements are mounted so that the rubber experiences shear forces in the vertical direction, thus providing the desired soft vertical ride, and compression forces in all other directions so as to resist "fore" and "aft" and rocking and rolling motions.

Forward and backward movement of the roller wheel beam results in compression or extension of the base of the U-shaped resilient rubber component. The suspension elements are very stiff when the resilient rubber component is compressed, thus limiting the "fore" and "aft" movement of the roller wheel beam with respect to the idler wheels. The suspension elements also provide relatively stiff support for the roller wheel beam with respect to rolling because such movement causes the U-shaped rubber component to be compressed at the bottom on one side and at the top of the other side of the leg of the T-shaped mounting component. Thus, motion of the roller wheel assembly with respect to the undercarriage frame due to either rocking and rolling is limited.

The stiffness of the resilient suspension element to compressive forces may be further increased by placing one or more generally vertical rigid shear plates within the U-shaped resilient rubber component midway between the inner surfaces of the T-shaped and U-shaped mounting components. The preferred embodiment employs two parallel shear plates. Vertical softness is unaffected by the use of such a shear plate. As shown in FIG. 11, the U-shaped resilient component 76 is formed as two U-shaped resilient members 78 and 80, separated by and secured to a generally vertical rigid U-shaped shear plate member 82. A rigid U-shaped shear plate member 82 is provided to increase the resistance of the suspension element to rolling movement of the roller wheel assembly 42 without decreasing the resilience of the support in the vertical direction.

If movement of the roller wheel assembly with respect to the undercarriage frame was not controlled in a predefined way, the roller wheels could rub on the idler wheels or on the undercarriage frame, thus providing unsatisfactory performance and resulting in potential damage to the track, roller wheels, idler wheels, and other undercarriage components. An advantage of the roller wheel assembly support system of this invention is to allow at least restricted motion, that is cushioning, in all directions, thus lowering the forces applied to the undercarriage support beam as a result of forces applied to the roller wheel assembly.

The roller wheel assembly in accordance with this invention efficiently utilizes the restricted space between the idler wheels and below the undercarriage beam and drive wheel by supporting the roller wheel on the roller wheel beam which is supported at its ends on the undercarriage beam by resilient suspension elements. This allows enough room for the structure of the roller wheel assembly, yet utilizes unused space at each end of the assembly for a resilient suspension element.

The resilient suspension system of this invention provides an economical and reliable system for resilient vertical suspension of a rubber tracked vehicle. Track suspension elements are usually mounted on pivot arms, such as in military tank type vehicles, which require the rollers on each side of the undercarriage assembly to move up and down parallel to one another. The resilient suspension system of this invention does not include such pivot joints which could wear or loosen, or air bags which could leak. The resilient suspension system of this invention is comparatively maintenance free. Further, the resilient suspension system for the roller wheel assembly of this invention permits limited side-to-side roll of the roller wheel assembly which improves ground contact of the rubber track. The roll of the roller wheel assembly is permitted within a limited range, but will restrict it under extreme ground conditions to prevent interference with and possible damage to other components of the undercarriage.

Figure 13:
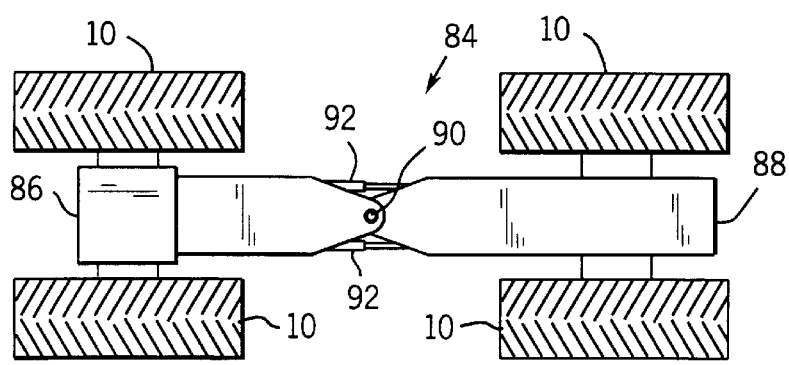
FIG. 13 is a top plan view of an articulated rubber tracked vehicle utilizing four track assemblies which include roller wheel assemblies utilizing resilient support elements in accordance with this invention.

In a preferred use of a roller wheel assembly including the resilient support elements of this invention, two roller wheel assemblies are used on each side of an articulated rubber tracked work vehicle. A roller wheel assembly is positioned on each side of the front section of the vehicle and a roller wheel assembly is positioned on each side of the rear section of the vehicle. A top plan view of such an articulated rubber tracked vehicle 84 is shown in FIG. 13. The articulated rubber tracked vehicle 84 includes a front section 86 and a rear section 88. The front and rear sections are pivotally secured to each other by a pin 90. Articulation of the front and rear sections with respect to each other is controlled by hydraulic operators 92. Track assemblies 10, which include roller wheel assembly incorporating the resilient support elements of this invention, are located on each side of both the front section 86 and the rear section 88 of the vehicle 84.

While only one embodiment of the invention has been shown, it should be apparent to those skilled in the art that what has been described is considered at present to be a preferred embodiment of the support system of this invention for roller wheels of a rubber tracked vehicle. Changes may be made in the roller wheel support system without actually departing from the true spirit and scope of this invention. The appended claims are intended to cover all such changes and modification which fall in the true spirit and scope of this invention.

The embodiments of the invention in which an exclusive property or privilege is claimed are defined as follows:

1. In a rubber tracked vehicle having a drive wheel and an undercarriage for supporting a pair of spaced apart idler wheels, a roller wheel assembly for supporting roller wheels between the idler wheels and below the drive wheel comprising:

a support having first and second ends, on which are supported a plurality of roller wheels disposed below the drive wheel; and a pair of suspension elements, one located at each of said first and second ends of the support for resiliently supporting the support from the undercarriage.

2. The roller wheel assembly of claim 1, wherein the pair of suspension elements provides resilient support in the vertical direction and limited resilience to "fore" and "aft" and rolling motion of the support with respect to the undercarriage.

3. The roller wheel assembly of claim 1, wherein the support is an elongated beam, and a plurality of axles are supported on the elongated beam, with each axle supporting a pair of roller wheels, which wheels are located on opposite sides of the elongated beam.

4. The roller wheel assembly of claim 3, wherein the roller wheels are located as close as possible to each other without interfering with each other, so as to provide increased support to the portion of the track engaging the surface on which the track rest.

5. The roller wheel assembly of claim 3, wherein the roller wheels closest to the idler wheels are located as close as possible to the idler wheels without the possibility of the roller wheels contacting the adjacent idler wheels during normal operation so as to provide increased support to the portion of the track engaging the surface on which the track rest.

6. In a rubber tracked vehicle having a drive wheel and an undercarriage including a support beam for supporting a pair of spaced apart idler wheels, a roller wheel assembly for supporting roller wheels between the idler wheels comprising:

a support means having first and second ends for supporting a plurality of roller wheels; and suspension elements, one located at each of said first and second ends of the support means, for resiliently supporting the support means from the support beam of the undercarriage.

7. The roller wheel assembly of claim 6, wherein each of the suspension elements is secured to the support beam of the undercarriage and provides resilient support in the vertical direction and limited resilience to "fore" and "aft" and rolling motion of the support means with respect to the undercarriage.

8. The roller wheel assembly of claim 7, wherein the suspension elements are secured to a bottom surface of the support beam of the undercarriage.

9. The roller wheel assembly of claim 6, wherein a plurality of axles are rigidly mounted on the support means, with each axle supporting a pair of roller wheels, which wheels are located on opposite sides of the support means.

10. The roller wheel assembly of claim 9, wherein the roller wheels are located as close as possible to each other, without interfering with each other, so as to provide increased support to the portion of the track engaging the surface on which the, track rest.

11. The roller wheel assembly of claim 9, wherein the roller wheels closest to the idler wheels are located as close as possible to the idler wheels without the possibility of the roller wheels contacting the adjacent idler wheels during normal operation so as to provide increased support to the portion of the track engaging the surface on which the track rest.

12. In a rubber tracked vehicle having a drive wheel and an undercarriage for supporting a pair of spaced apart idler wheels, a roller wheel assembly for supporting roller wheels between the idler wheels comprising:

a beam having first and second ends from which are supported a plurality of roller wheels; and pair of resilient suspension elements, one located at each of said first and second ends of the beam for resiliently supporting the beam from the undercarriage.

13. The roller wheel assembly of claim 12, wherein the pair of resilient suspension elements provides resilient support in the vertical direction and limited resilience to "fore" and "aft" and rolling motion of the beam with respect to the undercarriage.

14. The roller wheel assembly of claim 12, wherein a plurality of axles are rigidly mounted on the beam, with each axle supporting a pair of roller wheels, which wheels are located on opposite sides of the beam.

15. The roller wheel assembly of claim 14, wherein the roller wheels are located as close as possible to each other without interfering with each other, so as to provide increased support to the portion of the track engaging the surface on which the track rest.

16. The roller wheel assembly of claim 14, wherein the roller wheels closest to the idler wheels are located as close as possible to the idler wheels without the possibility of the roller wheels contacting the adjacent idler wheels during normal operation so as to provide increased support to the portion of the track engaging the surface on which the track rest.

17. In a rubber tracked vehicle having a drive wheel and an undercarriage including a support beam for supporting a pair of spaced apart idler wheels, a roller wheel assembly for supporting roller wheels between the idler wheels comprising:

a beam having first and second ends from which are supported a plurality of roller wheels; and a pair of resilient suspension elements, one located at each of said first and second ends of the beam for resiliently supporting the beam from the support beam of the undercarriage.

18. The roller wheel assembly of claim 17, wherein each of the resilient suspension elements is secured to the support beam of the undercarriage and provides resilient support in the vertical direction and limited resilience to "fore" and "aft" and rolling motion of the beam with respect to the undercarriage.

19. The roller wheel assembly of claim 18, wherein the resilient suspension elements are secured to the bottom surface of a support beam of the undercarriage.

20. The roller wheel assembly of claim 17, wherein a plurality of axles are rigidly mounted on the beam, with each axle supporting a pair of roller wheels, which wheels are located on opposite sides of the beam.

21. The roller wheel assembly of claim 20, wherein the roller wheels are located as close as possible to each other, without interfering with each other, so as to provide increased support to the portion of the track engaging the surface on which the track rest.

22. The roller wheel assembly of claim 20, wherein the roller wheels closest to the idler wheels are located as close as possible to the idler wheels without the possibility of the roller wheels contacting the adjacent idler wheels during normal operation so as to provide increased support to the portion of the track engaging the surface on which the track rest.

* * * * *